(12) United States Patent
Suzuki et al.

(10) Patent No.: US 6,696,649 B2
(45) Date of Patent: Feb. 24, 2004

(54) WEIGHT INSPECTING APPARATUS

(75) Inventors: Norikazu Suzuki, Gotenba (JP); Masaki Usui, Gotenba (JP)

(73) Assignees: Sumitomo Wiring Systems, Ltd., Mie (JP); Sumidenso Platech, Ltd., Gotenba (JP)

(*) Notice: Subject to any disclaimer, the term of this patent is extended or adjusted under 35 U.S.C. 154(b) by 192 days.

(21) Appl. No.: 09/911,410

(22) Filed: Jul. 25, 2001

(65) Prior Publication Data

US 2002/0023784 A1 Feb. 28, 2002

(30) Foreign Application Priority Data

Aug. 2, 2000 (JP) ........................................ 2000-234479

(51) Int. Cl.$^7$ ............................. G01G 15/00; B29C 31/00
(52) U.S. Cl. ......................... 177/50; 177/60; 177/116; 425/140; 425/169; 264/40.4; 209/592; 141/83; 222/77
(58) Field of Search ..................... 177/50, 60, 116; 425/140, 145, 169; 264/40.4; 222/55, 56, 77; 141/83; 209/592

(56) References Cited

U.S. PATENT DOCUMENTS

| 4,755,122 A | 7/1988 | Schmidt .................... 425/140 |
| 5,817,988 A | 10/1998 | Suzuki ........................ 177/50 |

FOREIGN PATENT DOCUMENTS

| EP | 0 455 820 A1 | 11/1991 |
| EP | 0 698 468 A1 | 2/1996 |
| JP | A 6-194414 | 7/1994 |
| JP | A 6-194415 | 7/1994 |
| JP | A 8-57430 | 3/1996 |
| JP | A 8-57431 | 3/1996 |

OTHER PUBLICATIONS

Wenskus, "Part Weight as a Control Metric for Injection Molding", Journal of Injection Molding Technology, Sep. 1997, vol. 1, No. 3, pp. 151–157, XP000765609.

*Primary Examiner*—Randy Gibson
(74) *Attorney, Agent, or Firm*—Oliff & Berridge, PLC

(57) ABSTRACT

The total weight of a plurality of resin products is set as a reference value, and a first upper-limit threshold and a first lower-limit threshold are respectively stored in a control circuit 38 on the upper limit side and the lower limit side with respect to the reference value. A second upper-limit threshold which is yet greater than the first upper-limit threshold and a second lower-limit threshold which is yet smaller than the first lower-limit threshold are stored in the control circuit 38. When the total weight of the resin products is greater than the first upper-limit threshold, a determination is made by the control circuit 38 as to whether or not the total weight of the resin products is yet greater than the second lower-limit threshold. Further, when the total weight of the resin products is less than the first upper-limit threshold, a determination is made by the control circuit 38 as to whether or not the total weight of the resin products is yet less than the second lower-limit threshold.

3 Claims, 8 Drawing Sheets

← DISCHARGING DIRECTION OF THE CONNECTOR HOUSING →

WEIGHT INSPECTING APPARATUS

BACKGROUND OF THE INVENTION

1. Technical Field

The present invention relates to a weight inspecting apparatus for inspecting the weight of a resin product molded by injection molding.

2. Related Art

Generally, a resin product such as a connector housing attached to an end portion of a wire harness for a vehicle is molded by injection molding. In this case, insufficient injection of a resin material, which is called "a short shot," sometimes occurs. The short shot, i.e., the insufficient injection of material, occurs in a case where the molten resin material has failed to spread in the entire mold cavity and the material has become insufficient due to the effects of the temperature condition, the pressurizing condition, and the like. Also, the short shot occurs when an air vent for allowing air inside the mold to escape during injection has become clogged. When the short shot occurs, an unfilled portion occurs in the resin product, and the product therefore becomes defective. Such defective products include various types ranging from those which are extremely close to nondefective products to those having large unfilled portions.

Incidentally, to totally eliminate defective resin products by eliminating the short shots is difficult with the structures and techniques of the present injection molding machines. Even if the injection molding machine is an excellent one, the short shots occur at a rate of once every several thousand to tens of thousands of molding operations.

In the light of these circumstances, inspection is conducted for inspecting whether the molded resin products are nondefective or defective. As a conventional inspection method, the resin products ejected from the injection molding machine are conveyed on a conveying belt, each of the resin products thus conveyed is allowed to drop and is placed on a receiving tray, and the receiving tray is then moved onto an electronic balance. To measure the weight of the resin product, after the weight of the receiving tray including the resin product is measured, the weight in which the weight of the receiving tray was subtracted from the measured value is set as the result of measurement of the resin product. Then, on the basis of the result of measurement by the electronic balance a determination is made as to whether the resin product is nondefective or defective.

If the result of determination is nondefective, only one of two lifting/lowering arms supporting both end portions of the receiving tray is raised, which in turn tilts the receiving tray, discharging the resin product into a nondefective-product collecting box. On the other hand, if the result of determination is defective, the receiving tray is tilted in the opposite direction to that of the above-described operation, discharging the resin product into a defective-product collecting box.

According to this inspection method, it would be possible to reduce the trouble of human visual inspection by a large number of inspectors. In other words, if the resin product has been determined to be defective, it suffices if the inspector checks only that product by visual inspection. Since the number of molded products which are determined to be defective is very small, the number of objects subject to visual inspection by inspectors is small, so that inspection is possible with less labor.

[Problems to be Solved]

With the conventional weight inspection apparatus, however, since a plurality of resin products ejected from the injection machine drop forcibly, there are cases where not all resin products can be accommodated on the receiving tray. In this case, since the total weight of the resin products in a smaller number is actually measured, there is a problem in that even if those resin products are nondefective, it is erroneously considered that a defective product due to a short shot or the like is included among them.

In addition, there have been cases where even if the receiving tray is tilted, some of the resin products still remain there. When the inventors of this application examined that trouble, it was found that the trouble is due to the fact that the resin products are charged with static electricity when the mold is opened. Namely, the force with which the resin products between themselves or the resin products and the receiving tray are attracted to each other occurs due to the static electricity with which the resin products are charged. Consequently, even if the receiving tray is tilted, the resin products sometimes fail to be discharged. In this case, if resin products which have been molded later are placed on the receiving tray in the state in which a resin product which has been molded earlier still remains on the receiving tray, the total weight of the resin products in a greater number is actually measured. Accordingly, there is a problem in that even if those resin products are nondefective, it is erroneously considered that a defective product due to the occurrence of burrs or the like is included among the products.

SUMMARY OF THE INVENTION

The invention has been devised in view of the above-described problems, and its object is to provide a weight inspecting apparatus which makes it possible to improve the inspection accuracy of the resin products.

[Means for Solving the Problems]

To solve the above-described problems, in the invention according to aspect 1, the gist lies in a weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is greater than a first upper-limit threshold, the weight inspecting apparatus comprising: storage means for storing a second upper-limit threshold which is yet greater than the first upper-limit threshold; and determining means for determining whether or not the total weight of the resin products is greater than the second upper-limit threshold when the total weight of the resin products is greater than the first upper-limit threshold.

In the invention according to aspect 2, the gist lies in a weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is less than a first lower-limit threshold, the weight inspecting apparatus comprising: storage means for storing a second lower-limit threshold which is yet smaller than the first lower-limit threshold; and determining means for determining whether or not the total weight of the resin products is less than the second lower-limit threshold when the total weight of the resin products is less than the first lower-limit threshold.

In the invention according to aspect 3, the gist lies in a weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is between a first upper-limit threshold and a first lower-limit threshold, the weight inspecting apparatus comprising: storage means for storing a second upper-limit threshold which is yet greater than the first upper-limit threshold and a second lower-limit threshold which is yet less than the first lower-limit threshold; and determining means for determining whether or not the total weight of the resin products is greater than the second upper-limit threshold when the total weight of the resin products is greater than the first upper-limit threshold, and determining whether or not the total weight of the resin products is less than the second lower-limit threshold when the total weight of the resin products is less than the first lower-limit threshold.

Hereafter, a description will be given of the "operation" of the invention.

In accordance with the invention according to aspect 1, a second upper-limit threshold which is yet greater than the first upper-limit threshold is set. Accordingly, when the total weight of the resin products is greater than the first upper-limit threshold as a result of the inspection of the resin products, and at least one of the resin products is thus found to be defective, a determination is further made as to whether or not the total weight of the resin products is greater than the second upper-limit threshold. For this reason, it is possible to specify due to what causes the resin products have become defective depending on whether or not the second upper-limit threshold has been exceeded. Hence, it is possible to improve the inspection accuracy of the resin products.

In accordance with the invention according to aspect 2, a second lower-limit threshold which is yet smaller than the first lower-limit threshold is set. Accordingly, when the total weight of the resin products is less than the first lower-limit threshold as a result of the inspection of the resin products, and at least one of the resin products is thus found to be defective, a determination is further made as to whether or not the total weight of the resin products is less than the second lower-limit threshold. For this reason, it is possible to specify due to what causes the resin products have become defective depending on whether or not the total weight of the resin products is less than the second lower-limit threshold. Hence, it is possible to improve the inspection accuracy of the resin products.

In accordance with the invention according to aspect 3, as has been described concerning the above-described operation in accordance with aspects 1 and 2, a determination is made as to whether or not the total weight of the resin products is greater than the second upper-limit threshold, and a determination is made as to whether or not the total weight of the resin products is less than the second lower-limit threshold. Accordingly, it is possible to further improve the inspection accuracy of the resin products.

DETAILED DESCRIPTION OF THE PREFERRED EMBODIMENTS

[Mode for Carrying Out the Invention]

Figure 1:
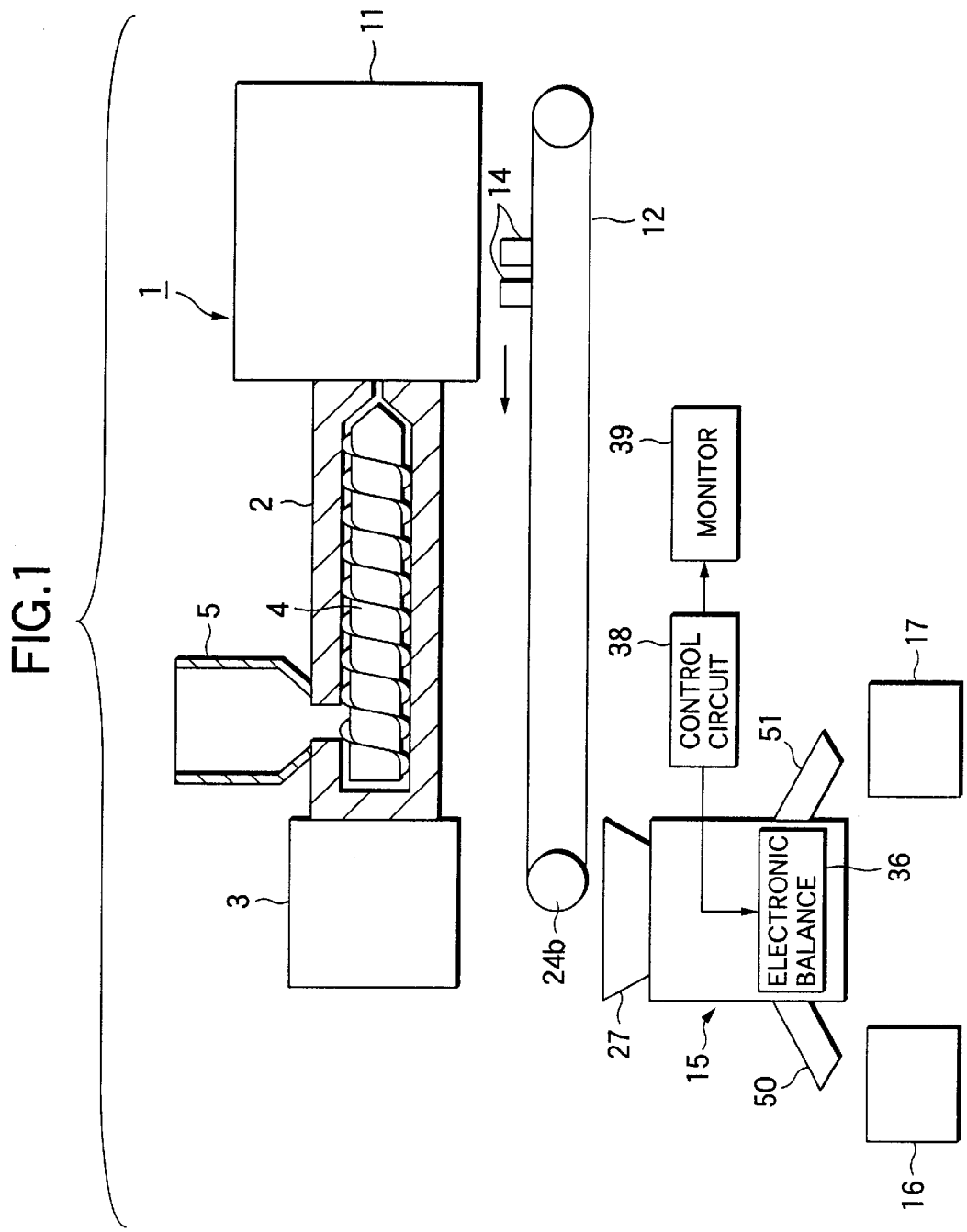
FIG. 1 is a schematic diagram of an injection molding system including a weight inspecting apparatus in accordance with an embodiment.

Referring now to the drawings, a detailed description will be given of an embodiment in which a weight inspecting apparatus for inspecting the weight of a connector housing for a wire harness is embodied in an injection molding system.

As shown in FIG. 1, an injection molding machine 1 has a heating cylinder 2, and a screw 4 which is rotated by an oil motor 3 is provided in the heating cylinder 2. A resin material which is supplied to a hopper 5 provided on an upper portion of a proximal end of the heating cylinder 2 is fed into a mold 11 while being melted by the screw 4.

A belt conveyor 12 serving as a conveying means is provided below the mold 11, and connector housings 14 serving as synthetic resin products which are ejected from the mold 11 are conveyed to a weight inspecting apparatus by this belt conveyor 12. The weight of the connector housing 14 is then measured by the weight inspecting apparatus 15, and a determination is made as to whether the connector housing 14 is nondefective or there is a possibility of the connector housing 14 being defective. Subsequently, the nondefective product is sent to a nondefective-product collecting box 16, while the connector housing 14 having the possibility of being defective is sent to a defective-product collecting box 17.

Figure 3:
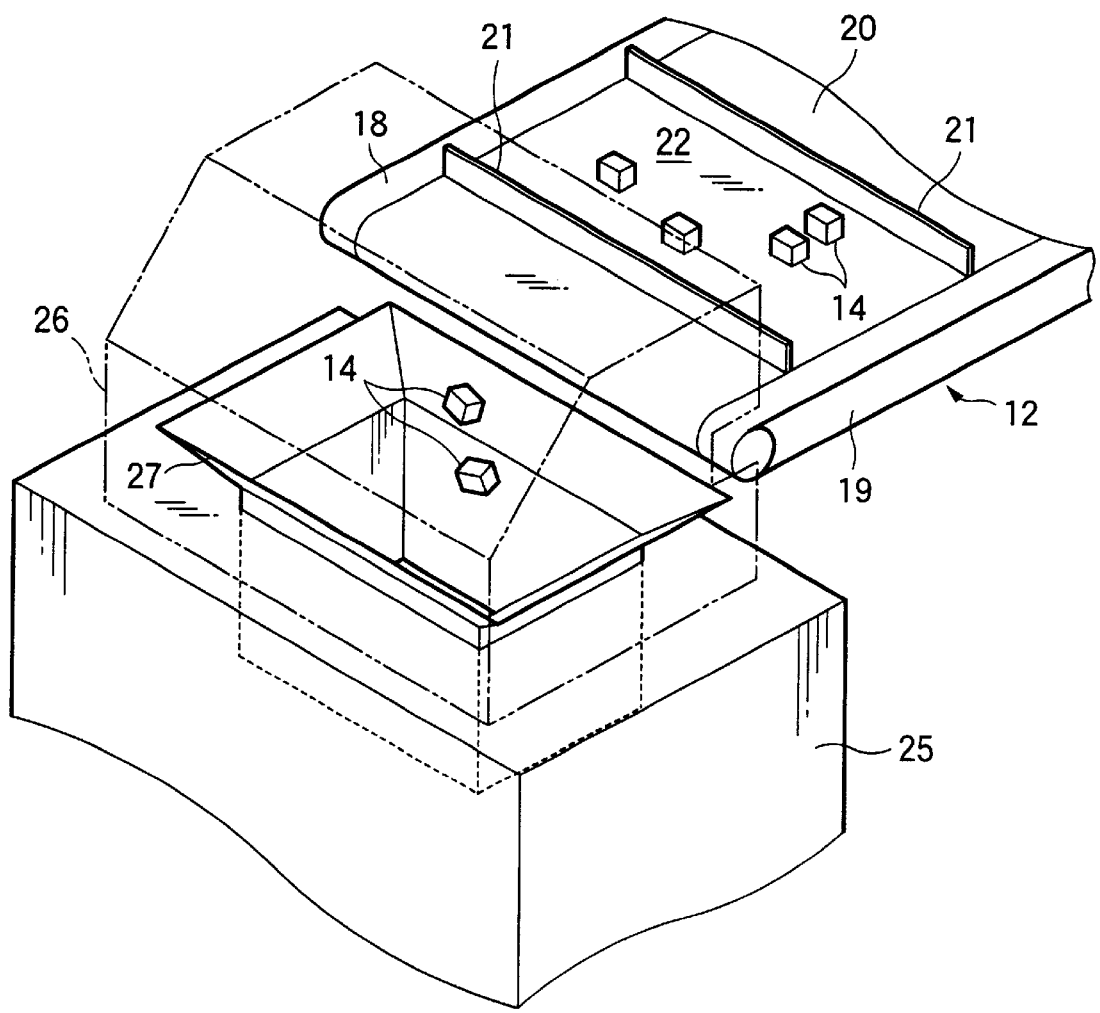
FIG. 3 is a perspective view illustrating an upper portion of the weight inspecting apparatus.

As shown in FIG. 3, the belt conveyor 12 has a pair of supporting frames 18 and 19 which are disposed on both sides of the belt conveyor 12 and are disposed in parallel to each other at an interval therebetween. A conveyor belt 20 which circulatingly moves in a fixed direction is trained between unillustrated two rotating rollers mounted at upstream end portions and downstream end portions of the supporting frames 18 and 19.

Restricting plates 21 and 22 are respectively fixed to downstream end portions of the supporting frames 18 and 19. Downstream end portions of the restricting plates 21 and 22 are formed by being bent toward the inner side of the conveyor belt 20. The connector housings 14 which have been conveyed from the upstream end portion of the conveyor belt 20 are gathered together to a central portion or its vicinity of the conveyor belt 20 by the restricting plates 21 and 22.

Next, a description will be given of the weight inspecting apparatus 15.

Figure 2:
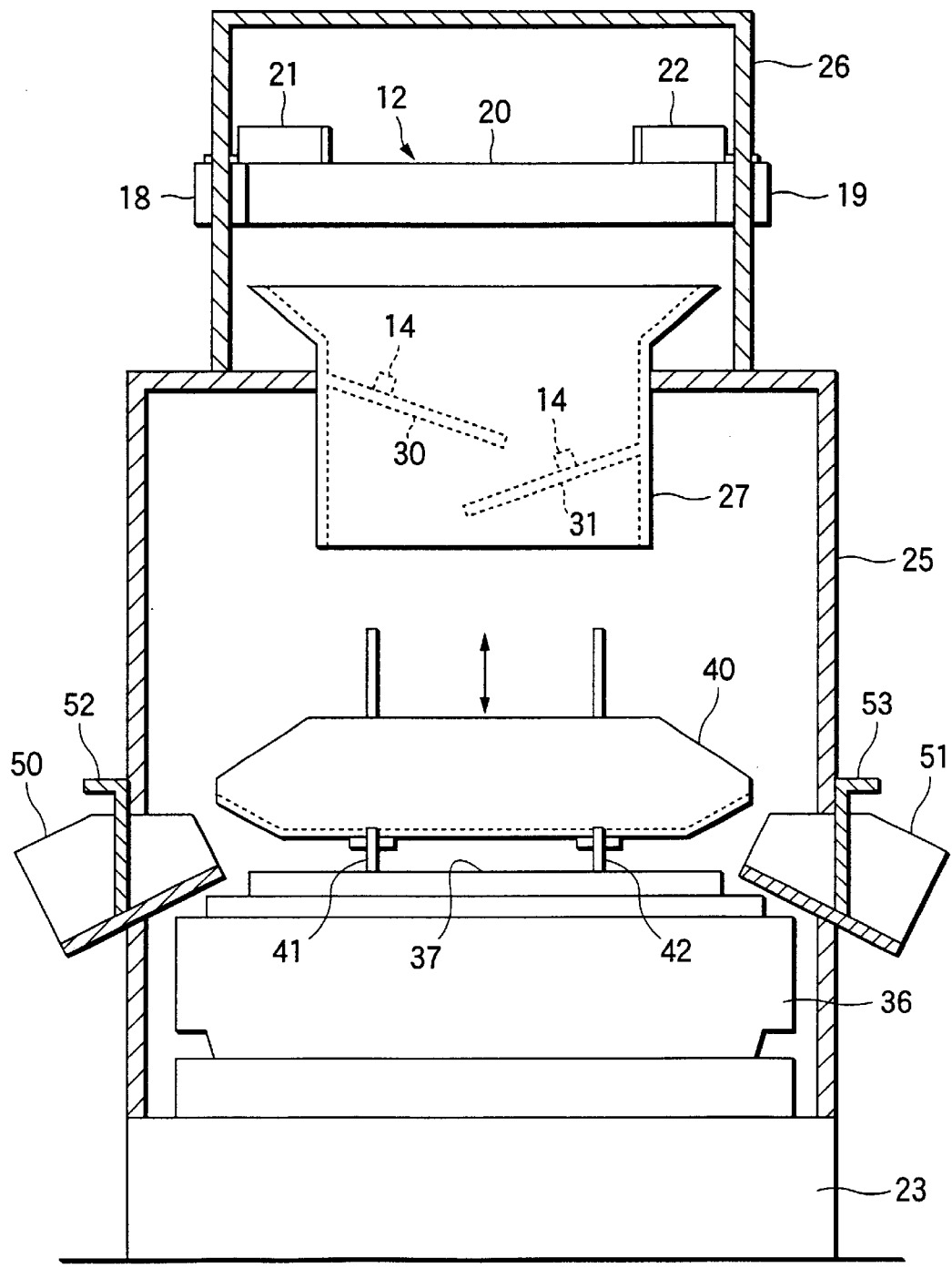
FIG. 2 is a cross-sectional view of the weight inspecting apparatus.

As shown in FIGS. 2 and 3, a windproof cover 25 made of a transparent or semitransparent resin is provided on an upper surface of a base 23 of the weight inspecting apparatus 15 to allow the inside to be confirmed. The windproof cover 25 may be formed of an opaque member. A hood 26 made of a transparent synthetic resin is provided on top of the windproof cover 25. A downstream end portion of the belt conveyor 12 is covered by this hood 26.

A square charging barrel 27 is penetrating provided in an upper portion of the windproof cover 25 at a position located inside the hood 26. This charging barrel 27 is located immediately below the downstream end portion of the belt conveyor 12. The connector housings 14 which have been conveyed by the belt conveyor 12 are charged through a supply port 27a which is formed at an upper portion of the charging barrel 27 in such a manner as to flare toward the outside. The reason the supply port 27a is flared is to prevent the connector housings 14 from falling off the charging barrel 27.

Figure 4:
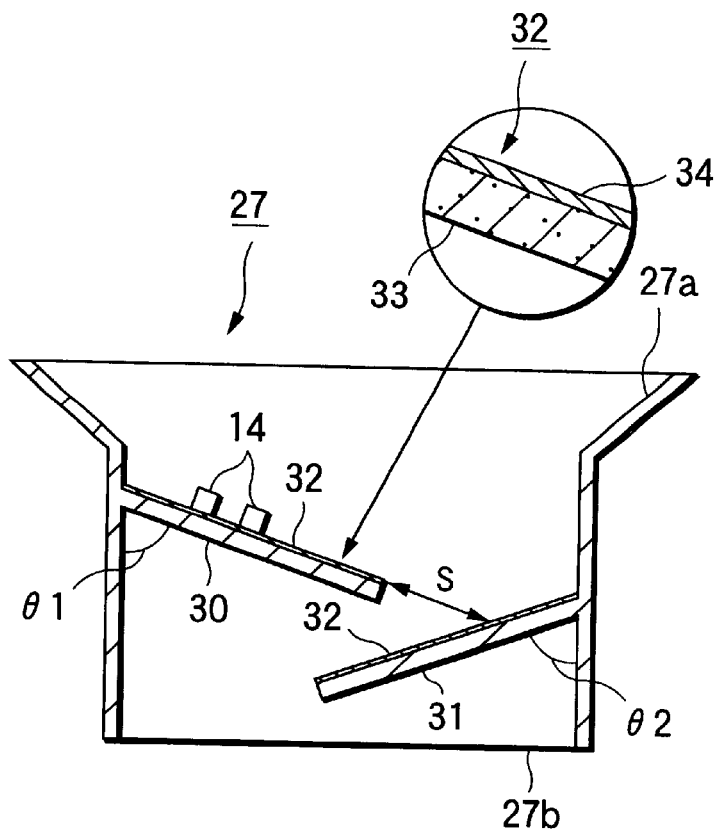
FIG. 4 is a cross-sectional view of a charging barrel of the weight inspecting apparatus.
Figure 5:
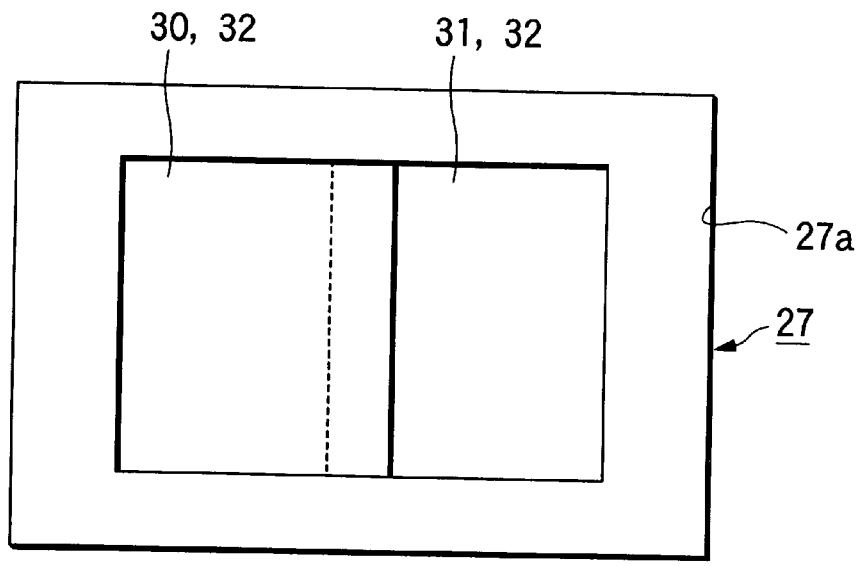
FIG. 5 is a plan view of the charging barrel.

As shown in FIGS. 4 and 5, a plurality of inclined plates 30 and 31 (two in this embodiment) serving as inclined members are provided in a portion excluding the supply port 27a. The respective inclined plates 30 and 31 are provided in such a manner as to be vertically offset and to be staggered on the left- and right-hand sides, and are respectively inclined downward. In other words, distal end portions of the inclined plates 30 and 31 are located on the lower side than proximal portions thereof. The distal end portions of the inclined plates 30 and 31, when seen projected from the vertical direction, overlapping portions are present. For this reason, the connector housings 14 supplied to the charging barrel 27 are unfailingly brought into contact with either one of the inclined plates 30 and 31.

A gap S is formed between the upper inclined plate 30 and the lower inclined plate 31. Through this gap S, the connector housings 14 are discharged from a discharge port 27b formed in a lower portion of the charging barrel 27. It should be noted that, in this embodiment, the angles of inclination, θ1 and θ2, of the inclined plates 30 and 31 are set in the range of 30°-45° with respect to a side surface (vertical direction) of the windproof cover 25. Apart from this numerical range, the angles of inclination, θ1 and θ2, may be set to arbitrary values within the range of 25°-60°.

Elastic mats 32 are respectively disposed on the upper surfaces of the inclined plates 30 and 31. Each elastic mat 32 is formed by bonding together a surface cloth 34 and an expanded base material 33 serving as a foam member formed of rubber or a synthetic resin by an adhesive agent. This expanded base material 33 excels in stretchability and is lightweight. The surface cloth 34 is made from synthetic fibers having an extremely low coefficient of friction. For this reason, even if the connector housing 14 which is small-sized and has a complex shape, the connector housing 14 is not caught by the surface cloth 34. Incidentally, in this embodiment, a wet suit cloth is for the elastic mat 32.

It should be noted that, in this embodiment, the thickness of the expanded base material 33 is set to 4 to 7 mm. Apart from this numerical range, the thickness of the expanded base material 33 may be changed to an arbitrary value within the range of 2 to 10 mm. Meanwhile, the thickness of the surface cloth 34 is set to 1 to 2 mm. Apart from this numerical range, the thickness of the surface cloth 34 may be changed to an arbitrary value within the range of 1 to 3 mm As shown in FIG. 2, an electronic balance 36 serving as a weight measuring device is provided inside the windproof cover 25 at a position located above the base 23. In other words, the entire surroundings of the electronic balance are covered by the windproof cover 25. Thanks to the presence of the windproof cover 25, the electronic balance is prevented from being subjected to a side wind. The electronic balance 36 is a so-called electromagnetic balance provided with a measurement table 37 on which objects to be measured (connector housings 14) are placed. As the electronic balance 36 in accordance with this embodiment, one having a weighing capacity of 410 g and a high-accuracy minimum reading of 0.001 g is used.

As shown in FIG. 1, a control circuit 38 serving as a control means, a storage means, and a determining means is electrically connected to the electronic balance 36. Various programs necessary for the electronic balance 36 are stored in the control circuit 38.

Figure 14:
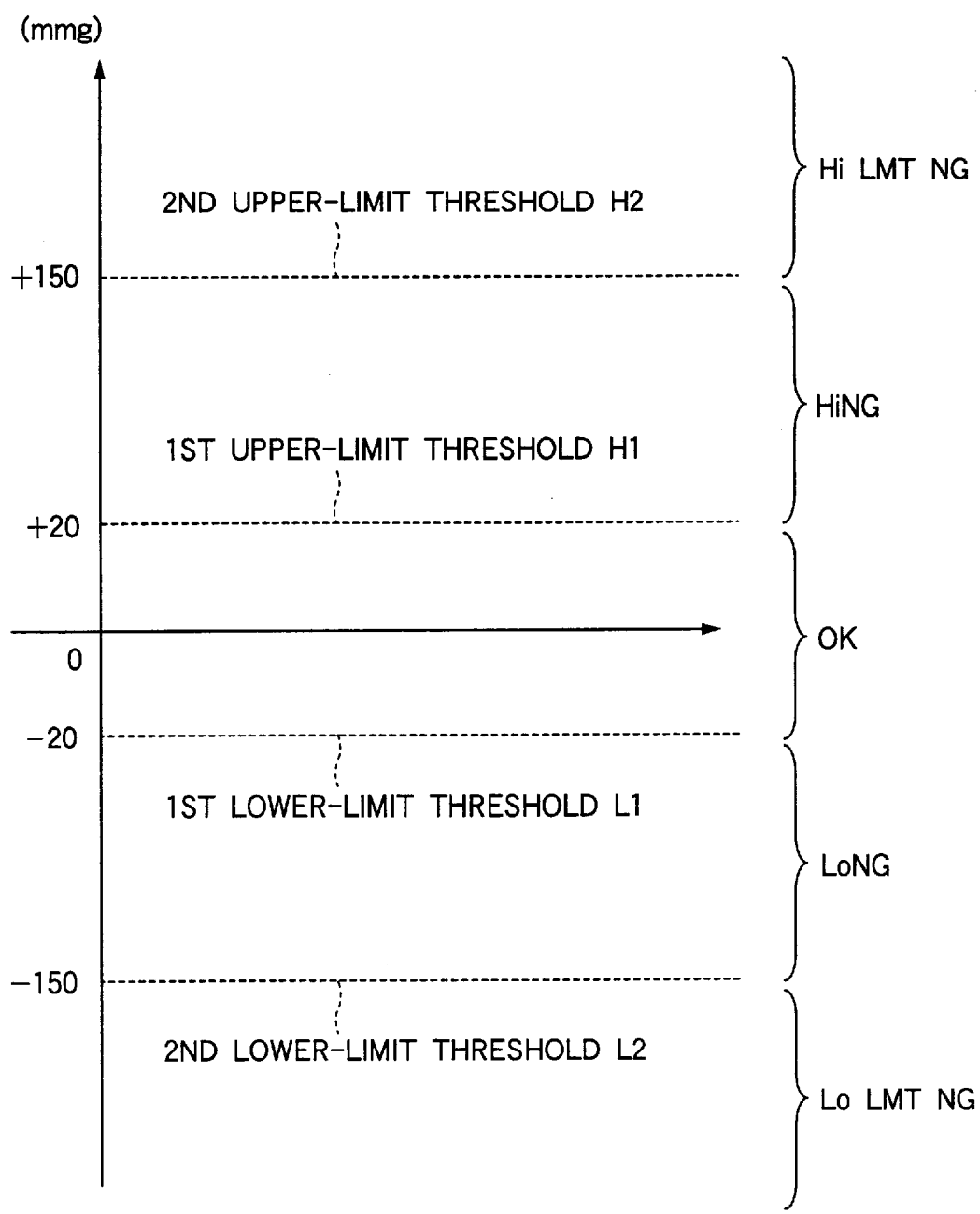
FIG. 14 is a diagram illustrating the relationship between the total weight of connector housings and thresholds.

As shown in FIGS. 1 and 14, the total weight of a plurality of connector housings 14 to be subject to weight inspection is set as a reference value, and a first upper-limit threshold H1 which is greater by a predetermined value than that reference value is stored in the memory provided in the control circuit 38. Namely, the first upper-limit threshold H1 is set to inspect whether the connector housings 14 are nondefective or not. The control circuit 38 determines whether or not the total weight of the connector housings 14 is greater than the first upper-limit threshold H1. On the basis of the result of the determination that the total weight is greater than the first upper-limit threshold H1, the control circuit 38 determines that at least one of the connector housings 14 is defective.

A second upper-limit threshold H2 which is yet greater than the first upper-limit threshold H1 is stored in the memory provided in the control circuit 38. This second upper-limit threshold H2 is set to inspect whether or not the total number of the connector housings 14 placed on a receiving tray 40 is greater than a predetermined number. The control circuit 38 determines whether or not the total weight of the connector housings 14 is greater than the second upper-limit threshold H2. On the basis of the result of the determination that the total weight is greater than the second upper-limit threshold H2, the control circuit 38 determines that the number of the connector housings 14 whose weight has been measured is greater than the predetermined number.

It should be noted that, in this embodiment, in a case where the appropriate total weight of the connector housings 14 is set to the reference value of 20.5 g (20,500 mg), the first upper-limit threshold H1 is set to +20 mg with respect to that reference value. In short, the first upper-limit threshold H1 is +1025-fold the reference value. The first upper-limit threshold H1 may be changed to an arbitrary value in the range of +1000- to 1200-fold the reference value apart from the aforementioned value.

Meanwhile, the second upper-limit threshold H2 is set to +150 mg with respect to the reference value. In short, the second upper-limit threshold H2 is about +137-fold the reference value, i.e., 7.5-fold the first upper-limit threshold H1. The second upper-limit threshold H2 may be changed to an arbitrary value in the range of +1000 to 120- to 500-fold the reference value apart from the aforementioned value. Further, the second upper-limit threshold H2 may be changed to an arbitrary value in the range of 6- to 10-fold the first upper-limit threshold H1.

In addition, a first lower-limit threshold L1 which is smaller by a predetermined value than that reference value of the total weight of the connector housings 14 subject to weight inspection is stored in the memory provided in the control circuit 38. Namely, the first lower-limit threshold L1 is set to inspect whether the connector housings 14 are nondefective or not. The control circuit 38 determines whether or not the total weight of the connector housings 14 is less than the first lower-limit threshold L1. On the basis of the result of the determination that the total weight is less than the first lower-limit threshold L1, the control circuit 38 determines that at least one of the connector housings 14 is defective.

A second lower-limit threshold L2 which is yet smaller than the first lower-limit threshold L1 is stored in the memory provided in the control circuit 38. This second lower-limit threshold L2 is set to inspect whether or not the total number of the connector housings 14 placed on a receiving tray 40 is smaller than a predetermined number. The control circuit 38 determines whether or not the total weight of the connector housings 14 is less than the second lower-limit threshold L2. On the basis of the result of the determination that the total weight is less than the second lower-limit threshold L2, the control circuit 38 determines that the number of the connector housings 14 whose weight has been measured is less than the predetermined number.

It should be noted that, in this embodiment, the first lower-limit threshold L1 is set to −20 mg with respect to that reference value. In short, the first lower-limit threshold L1 is −1025-fold the reference value. The first lower-limit threshold L1 may be changed to an arbitrary value in the range of −1000- to −1200-fold the reference value apart from the aforementioned value.

Meanwhile, the second lower-limit threshold L2 is set to −150 mg with respect to the reference value. In short, the second lower-limit threshold L2 is about −137-fold the reference value, i.e., 7.5-fold the first lower-limit threshold L1. The second lower-limit threshold L2 may be changed to an arbitrary value in the range of −1000 to 120- to 500-fold the reference value apart from the aforementioned value. Further, the second lower-limit threshold L2 may be changed to an arbitrary value in the range of 6- to 10-fold the first lower-limit threshold L1.

A monitor 39 serving as a display means constituted by an LCD, a CRT, or the like is electrically connected to the control circuit 38. The monitor 39 is adapted to display the cause of the connector housing 14 becoming defective.

As shown in FIG. 2, the receiving tray 40 serving as a receiving member is provided above the electronic balance 36 and below the charging barrel 27. This receiving tray 40 is supported by two lifting/lowering arms 41 and 42 having unillustrated air cylinders as their driving sources. The lifting/lowering arms 41 and 42 are capable of being respectively raised or lowered independently.

Figure 11:
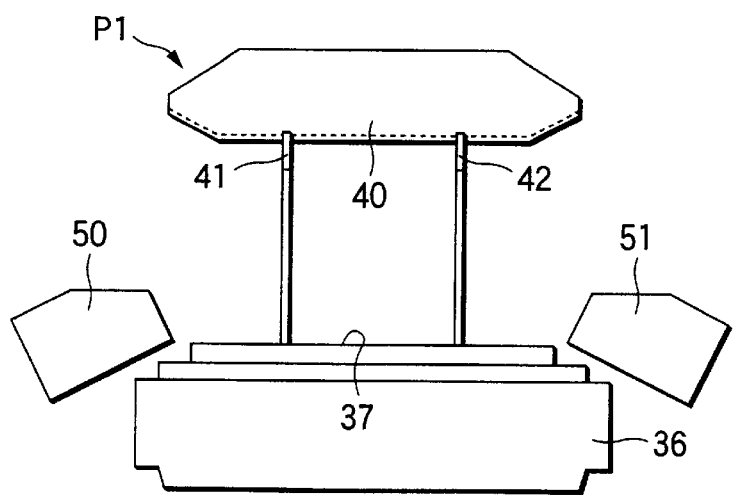
FIG. 11 is a schematic diagram in a case where the receiving tray is at a receiving position.
Figure 12:
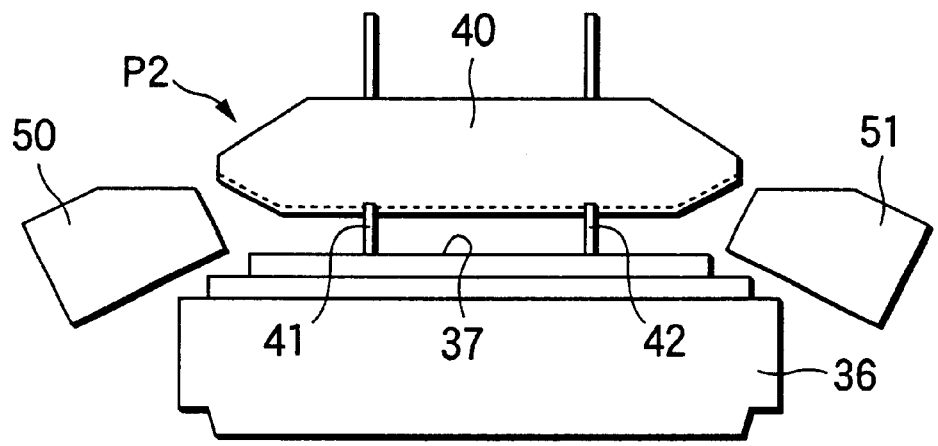
FIG. 12 is a schematic diagram in a case where the receiving tray is at a measuring position.
Figure 13:
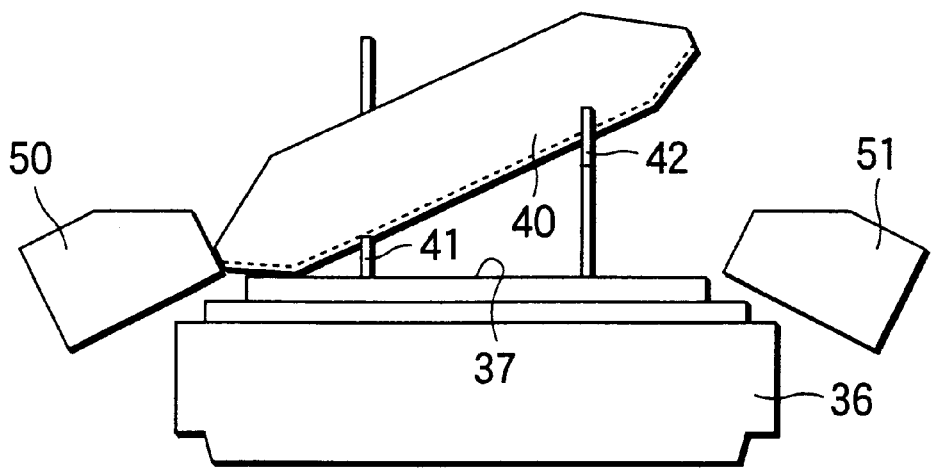
FIG. 13 is a schematic diagram in a case where the receiving tray is in a tilted state.

As shown in FIG. 11, in a case where the connector housings 14 to be measured are placed on the receiving tray 40, the two lifting/lowering arms 41 and 42 are raised to allow the receiving tray 40 to be disposed at a receiving position P1 spaced apart from the electronic balance 36. In addition, as shown in FIG. 12, in a case where the connector housings 14 are measured, the two lifting/lowering arms 41 and 42 are lowered slowly, allowing the receiving tray 40 to be disposed at a measuring position P2 in contact with the measurement table 37. The reason for separately providing the receiving position P1 and the measuring position P2 for the receiving tray 40 is that if the connector housings 14 subject to weight inspection are directly dropped onto the measurement table 37, a shock occurs and can be a cause of failure. Further, as shown in FIG. 13, in a case were the connector housings 14 are discharged from the receiving tray 40, one of the lifting/lowering arms 41 and 42 is raised, and the other one is lowered, allowing the receiving tray 40 to be tilted in either leftward or rightward direction.

Figure 7:
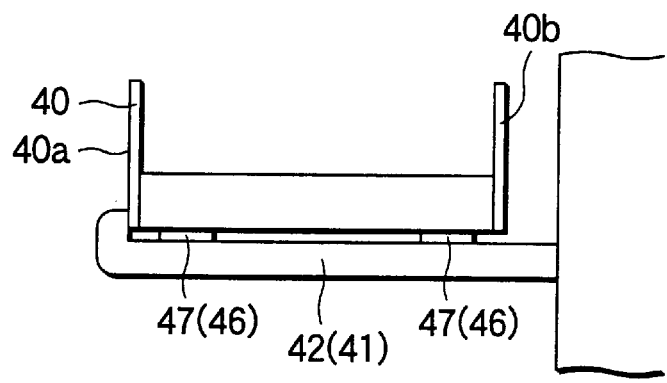
FIG. 7 is a side elevational view of the receiving tray and the lifting/lowering arms.

As shown in FIG. 7, front and rear side walls 40a and 40b of the receiving tray 40 are formed by being bent upward so as to reliably receive the connector housings 14 which are dropped from the belt conveyor 12. Specifically, the front and rear side walls 40a and 40b of the receiving tray 40 are bent orthogonally to the bottom surface.

Figure 8:
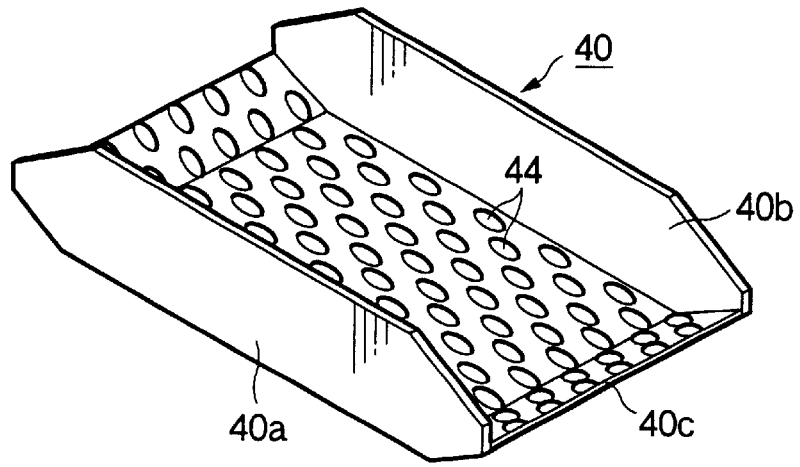
FIG. 8 is a perspective view of the receiving tray.
Figure 9:
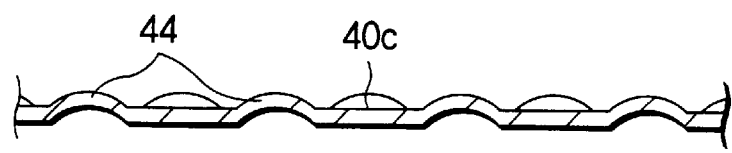
FIG. 9 is a cross-sectional view of projections formed on a bottom portion of the receiving tray.
Figure 10:
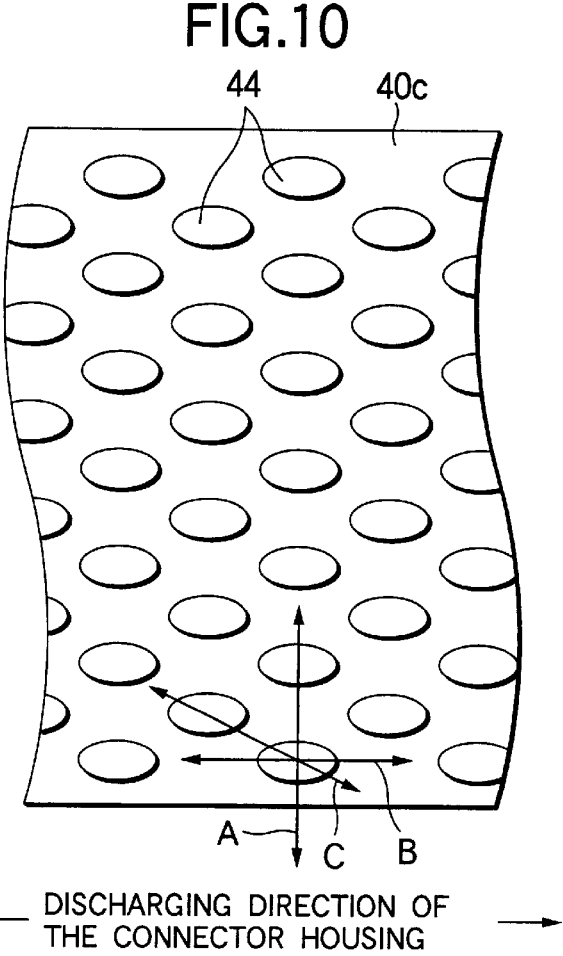
FIG. 10 is a plan view of the projections formed on the bottom portion of the receiving tray.

As shown in FIGS. 8 to 10, left and right end portions of a bottom portion 40c of the receiving tray 40 are formed by being bent diagonally upward. A multiplicity of projections 44 which are elevated toward the inner side of the receiving tray 40 are formed on the entire bottom portion 40c of the receiving tray 40. Due to the presence of the projections 44, the overall upper surface of the bottom portion 40c of the receiving tray 40 is formed as an irregular surface. For this reason, when the connector housing 14 has entered the receiving tray 40, the area of contact between the connector housing 14 and the bottom portion 40c becomes small.

The projections 44 are all of the same size, are formed in a semi-elliptical cross-sectional shape (elongated dome shape), and are elongated along the direction in which the connector housing 14 is discharged from the receiving tray 40 (in the left-and-right direction in FIG. 2). The reason for this is to allow the connector housings 14 to be discharged smoothly from the receiving tray 40. As viewed from the back-and-forth direction (the direction of A in FIG. 10), the left-and-right direction (the direction of B in FIG. 10), and the diagonal direction (the direction of C in FIG. 10), the projections 44 are regularly arranged at fixed intervals in all of these directions. When the projections 44 arranged in the back-and-forth direction A or the left-and-right direction B are viewed, the projections 44 are arranged in a relationship of being positionally offset alternately. Namely, the projections 44 are respectively arranged in a staggered manner in the back-and-forth and left-and-right directions A and B.

Figure 6:
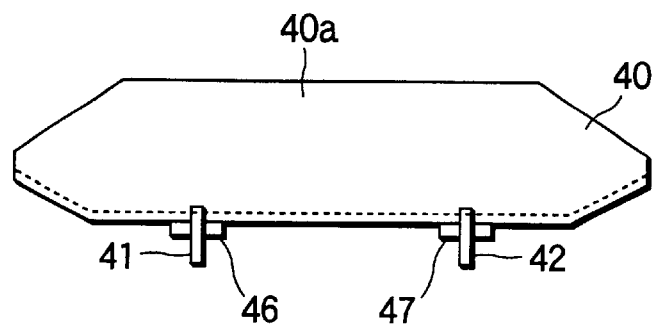
FIG. 6 is a front elevational view of a receiving tray and lifting/lowering arms.

As shown in FIGS. 6 and 7, the receiving tray 40 is supported by the lifting/lowering arms 41 and 42 by means of a plurality of reinforcing members 46 and 47 fixed to an outer surface of its bottom portion 40c. In other words, the receiving tray 40 is not in direct contact with the lifting/lowering arms 41 and 42 due to the presence of the reinforcing members 46 and 47. The reinforcing members 46 and 47 are formed of a hard material, i.e., a ceramic in this embodiment. For this reason, the amount of wear at the joints between the reinforcing members 46 and 47 and the lifting/lowering arms 41 and 42 is extremely small. It should be noted that, in this embodiment, two reinforcing members 46 and 47 are provided for each of the lifting/lowering arms 41 and 42.

As shown in FIG. 2, trough-shaped discharge passages 50 and 51 extending diagonally downward are respectively provided in the vicinities of the left and right sides of the receiving tray 40 at positions located at left and right side walls of the windproof cover 25. Each of the discharge passages 50 and 51 projects from the interior of the windproof cover 25 to the outside. Further, the connector housings 14 which slip down from the receiving tray 40 are adapted to be guided to the nondefective-product collecting box 16 or the defective-product collecting box 17 through the discharge passage 50 or 51.

Vertically movable shutters 52 and 53 are respectively provided midway in the discharge passages 50 and 51 along the left and right side walls of the windproof cover 25. Thee shutters 52 and 53 have unillustrated air cylinders as their driving sources. As the shutters 52 and 53 are lowered, the discharge passages 50 and 51 are closed, whereas as the shutters 52 and 53 are raised, the discharge passages 50 and 51 are opened. Accordingly, since the discharge passages 50 and 51 can be opened only when necessary, a side wind is prevented from entering the windproof cover 25 as practically as possible.

Next, a description will be given of the operation of the injection molding system including the weight inspecting apparatus 15 constructed as described above.

When the mold 11 of the injection molding machine 1 is opened, a plurality of connector housings 14 (four to eight connector housings in this embodiment) drop onto an upstream end of the belt conveyor 12 at a time. Further, at the downstream end of the belt conveyor 12, the plurality of connector housings 14 are gathered together to the central portion or its vicinity by the restricting plates 21 and 22, and are conveyed to the weight inspecting apparatus 15. Namely, the plurality of connector housings 14 dropped from the belt conveyor 12 are charged into the charging barrel 27 through the hood 26.

Then, each connector housing 14 first drops onto the elastic mat 32 provided on the upper inclined plate 30, and slips down to a lower portion of the upper inclined plate 30. Subsequently, the connector housing 14, while being brought into contact with the elastic mat 32 provided on the lower inclined plate 31, slips down on the lower inclined plate 31, passes through the gap S, and is discharged from the discharge port 27b of the charging barrel 27.

Alternatively, the connector housing 14 which first dropped onto the lower inclined plate 31 without dropping onto the upper inclined plate 30, passes through the gap S, and is discharged from the discharge port 27b of the charging barrel 27. In either case, the connector housings 14 are unfailingly brought into contact with either one or both of the elastic mats 32 of the two inclined plates 30 and 31 before being discharged from the discharge port 27b of the charging barrel 27.

In other words, as the connector housings 14 are brought into contact with the two inclined plates 30 and 31, their dropping velocity declines suddenly. For this reason, even if the connector housings 14 are charged forcibly into the supply port 27a of the charging barrel 27, in the vicinity of the discharge port 27b the connector housings 14 are discharged at a slow dropping velocity. Moreover, as the connector housings 14 strike the elastic mats 32 respectively provided on the inclined plates 30 and 31, the impact with respect to the connector housings 14 can be alleviated.

The connector housings 14 discharged from the discharge port 27b of the charging barrel 27 drop onto the receiving tray 40 which has already been on standby at the receiving position P1. Then, the lifting/lowering arms 41 and 42 are lowered simultaneously, and the receiving tray 40 moves slowly to the measuring position P2. At this measuring position P2, the receiving plate 40 with the connector housings 14 placed thereon is placed on the measurement table 37 of the electronic balance 36. It should be noted that unillustrated legs are respectively provided projectingly at four corners of the outer surface of the bottom portion 40c of the receiving tray 40, and these four legs are brought into contact with the measurement table 37. At this time, a gap is produced between the lower surface of the receiving tray 40 and the obverse surface of the measurement table 37, and the lifting/lowering arms 41 and 42 are located in this gap and are positioned so as to be spaced apart from the receiving tray 40.

When the receiving tray 40 with the connector housings 14 placed thereon is placed on the measurement table 37, the weight of the receiving tray 40 including the connector housings 14 is measured. Then, the total weight of only the connector housings 14 obtained by subtracting the weight of the receiving tray 40 from that measured value is displayed on the monitor 39 as the result of measurement.

When the measured value is between the first upper-limit threshold H1 and the first lower-limit threshold L1 as the result of measurement of the total weight of the plurality of connector housings 14, it is determined that the connector housings 14 are nondefective. To give a description of this determining method, the control circuit 38 provided in the weight inspecting apparatus 15 calculates the weight of the connector housings 14 on the basis of a measurement signal outputted from the measurement table 37, and determines whether that calculated weight is greater than the first upper-limit threshold H1 stored in advance in the memory or is less than the first lower-limit threshold L1 similarly stored therein.

Then, if, as a result of the determination, the measured value of the connector housings 14 thus calculated has fallen within the allowance with respect to the reference value of the total weight of the connector housings 14, the control circuit 38 determines that all the connector housings 14 are nondefective. On the other hand, if the the measured value of the connector housings 14 has not fallen within the allowance, i.e., if the measured value is either greater than the first upper-limit threshold H1 or less than the first lower-limit threshold L1, the control circuit 38 determines that at least one of the connector housings 14 is defective.

If it is determined that the connector housings 14 are nondefective, after only the left-hand shutter 52 is opened, only the right-hand lifting/lowering arm 42 is raised, as shown in FIG. 13. Consequently, the receiving tray 40 is tilted diagonally. Therefore, the plurality of connector housings 14 slip to the left-hand side on the bottom portion 40c of the receiving tray 40, and are allowed to drop to the nondefective-product collecting box 16 through the left-hand discharge passage 50. Subsequently, after the lapse of a fixed time, the left-hand lifting/lowering arm 41 is raised, so that the receiving tray 40 returns to the receiving position P1.

If it is determined that at least one of the connector housings 14 is defective, after only the right-hand shutter 53 is opened, only the left-hand lifting/lowering arm 41 is raised, tilting the receiving tray 40 in the opposite direction to that of the above-described case. Therefore, the plurality of connector housings 14 slip to the right-hand side on the bottom portion 40c of the receiving tray 40, and are allowed to drop to the defective-product collecting box 17 through the right-hand discharge passage 51. Subsequently, after the lapse of a fixed time, the right-hand lifting/lowering arm 42 is raised, so that the receiving tray 40 returns to the receiving position P1.

If it is determined that at least one of the connector housings 14 is defective, the control circuit 38 determines whether or not the measured value is greater than the second upper-limit threshold H2. If it is determined that the measured value is not greater than the second upper-limit threshold H2, i.e., if the measured value is located between the first and second upper-limit thresholds H1 and H2, the control circuit 38 causes the monitor 39 to display that burrs have occurred on the connector housing 14 or a foreign object has been attached thereto.

On the other hand, if it is determined that the measured value is greater than the second upper-limit threshold H2, the control circuit 38 causes the monitor 39 to display that the total weight of the connector housings 14 more numerous than the number appropriate for inspection has been measured. Then, through the judgment of the operator who viewed this monitor 39, these connector housings 14 are removed from the receiving tray 40.

Incidentally, the case in which the connector housings 14 more numerous than the number appropriate for inspection are placed on the receiving tray 40 is the case in which one or more connector housings 14 molded still remain on the receiving tray 40. Then, since the subsequently molded connector housings 14 are placed on the receiving tray 40, the total number of the connector housings 14 increases. As a major cause for this trouble, it is possible to cite the case in which when the connector housings 14 slip down on the receiving tray 40, the connector housings 14 are electrically attracted to each other by static electricity with which they are charged.

In accordance with this embodiment, however, when the connector housings 14 slip down on the receiving tray 40, since the bottom portion 40c of the receiving tray 40 is has an undulating shape (irregular surface), the area of contact between the connector housing 14 and the bottom portion 40c is small. Accordingly, since the frictional resistance at the time when the connector housing 14 slips down is small, the amount of static electricity with which the connector housing 14 is charged becomes small. Since the force with which the receiving tray 40 and each connector housing 14 are electrically attracted to each other can be made small, it is possible to prevent the connector housings 14 from remaining on the receiving tray 40 as practically as possible.

In the case where it is determined that at least one of the connector housings 14 is defective, the control circuit 38 determines whether or not the measured value is less than the second lower-limit threshold L2. If it is determined that the measured value is not less than the second lower-limit threshold L2, i.e., if the measured value is located between the first and second lower-limit thresholds L1 and L2, the control circuit 38 causes the monitor 39 to display that at least one of the connector housings 14 is nondefective due to a short shot or the like.

On the other hand, if it is determined that the measured value is less than the second lower-limit threshold L2, the control circuit 38 causes the monitor 39 to display that the total weight of the connector housings 14 less than the number appropriate for inspection has been measured. Then, through the judgment of the operator who viewed this monitor 39, these connector housings 14 are removed from the receiving tray 40.

As the cause for the fact that the connector housings 14 less than the number appropriate for inspection are placed on the receiving tray 40, it is possible to cite the case in which one or more connector housings 14 are scattered outside the receiving tray 40 due to the impact occurring when the connector housings 14 which dropped from the belt conveyor 12 strike the receiving tray 40.

Accordingly, in accordance with this embodiment, it is possible to obtain the following advantages.

(1) The second upper-limit threshold H2 which is yet greater than the first upper-limit threshold Hi is stored in the control circuit 38. In the case where the total weight of the connector housings 14 has been greater than the first upper-limit threshold H1, a determination is made by the control circuit 38 as to whether or not the second upper-limit threshold H2 has also been exceeded. For this reason, it can be understood that if the second upper-limit threshold H2 has not been exceeded, burrs or the like have occurred on at least one of the connector housings 14, and if the second upper-limit threshold H2 has been exceeded, connector housings 14 in a number more numerous than the predetermined number have been measured. Accordingly, since it is possible to specify due to what causes the connector housings 14 have become defective, it is possible to improve the inspection accuracy of the connector housings 14.

(2) The second lower-limit threshold L2 which is yet smaller than the first lower-limit threshold L1 is stored in the control circuit 38. In the case where the total weight of the connector housings 14 is less than the first lower-limit threshold L1, a determination is made by the control circuit 38 as to whether or not the measured weight is less than the second lower-limit threshold L2. For this reason, it can be understood that if the measured weight is not less than the second lower-limit threshold L2, a short shot or the like has occurred in the connector housing 14, and if the measured weight is less than the second lower-limit threshold L2, connector housings 14 in a number less than the predetermined number have been measured. In this case as well, since it is possible to specify due to what causes the connector housings 14 have become defective, it is possible to improve the inspection accuracy of the connector housings 14.

(3) The causes of trouble ar displayed on the monitor 39 by the control circuit 38. For this reason, the operator is able to easily ascertain the causes of the connectors housing 14 having become defective. Consequently, since it is unnecessary to stop the weight inspecting apparatus 15 in correspondence with the causes of the trouble, the weight inspecting apparatus 15 in accordance with the invention leads to improvement of the operating efficiency in injection molding.

It should be noted that the embodiment of the invention may be modified as described below.

Although, in the above-described embodiment, the respective thresholds L1, L2, H1, and H2 are stored in the memory of the control circuit 38, only one of the groups of the first and second upper-limit thresholds H1 and H2 and the first and second lower-limit thresholds L1 and L2 may be stored. In the case where only the first and second upper-limit thresholds H1 and H2 are stored in the control circuit 38, when the total weight of the connector housings 14 is greater than the first upper-limit threshold H1, the control circuit 38 is made to determnine whether or not the total weight of the connector housings 14 is yet greater than the second upper-limit threshold H2. On the other hand, in the case where only the first and second lower-limit thresholds L1 and L2 are stored in the control circuit 38, when the total weight of the connector housings 14 is less than the first lower-limit threshold L1, the control circuit 38 is made to determnine whether or not the total weight of the connector housings 14 is yet less than the second lower-limit threshold L2.

In the above-described embodiment, in the case where the connector housings 14 are defective, their causes are displayed on the monitor 39 such as the LCD or the CRT. Apart from this type of monitor 39, it is possible to use an indicating lamp constituted by, for instance, an LED or a lamp, and effect printing on paper by using a printer.

Although, in the above-described embodiment, four connector housings 14 are collectively measured, two, three, or five connector housings may be connectively measured.

In addition to the technical concepts described within the scope of aspects, technical concepts which can be understood by the above-described embodiment will be enumerated below.

(1) The weight inspecting apparatus according to aspect 1 or 3, wherein the second upper-limit threshold is set to 1000- to 2000-fold by using the total weight of the resin products as a reference.

(2) The weight inspecting apparatus according to aspect 1 or 3, wherein the second upper-limit threshold is set to 6- to 10-fold the first upper-limit threshold.

(3) The weight inspecting apparatus according to aspect 2 or 3, wherein the second lower-limit threshold is set to −1000- to −2000-fold by using the total weight of the resin products as a reference.

(4) The weight inspecting apparatus according to aspect 1 or 3, wherein the second lower-limit threshold is set to 6- to 10-fold the first lower-limit threshold.

(5) The weight inspecting apparatus according to any one of items (1) to (5) above and any one of aspects 1 to 3, wherein display means is provided for displaying the cause of trouble of the resin products on the basis of the result of determination by the determining means.

(6) A weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is greater than a first upper-limit threshold, the weight inspecting apparatus comprising: storage means for storing a second upper-limit threshold which is yet greater than the first upper-limit threshold; and determining means for determining whether or not the total weight of the resin products is greater than the second upper-limit threshold.

(7) A weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is less than a first lower-limit threshold, the weight inspecting apparatus comprising: storage means for storing a second lower-limit threshold which is yet smaller than the first lower-limit threshold; and determining means for determining whether or not the total weight of the resin products is less than the second lower-limit threshold.

(8) An injection molding system comprising: an injection molding machine including a mold for molding resin products; conveying means for receiving and conveying the resin products which are dropped from the injection molding machine; and a weight inspecting apparatus for inspecting the weight of the resin products which have been conveyed by the conveying means, wherein the weight inspecting apparatus is constructed in accordance with any one of aspects 1 to 3.

(9) A weight inspection method in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is greater than a first upper-limit threshold, the weight inspection method comprising the steps of: setting a second upper-limit threshold which is yet greater than the first upper-limit threshold; and determining whether or not the total weight of the resin products is greater than the second upper-limit threshold after a determination is made that the total weight of the resin products is greater than the first upper-limit threshold.

(10) A weight inspection method in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the resin products are nondefective on the basis of whether or not the total weight of the plurality of resin products placed on the receiving member at the measuring position is less than a first lower-limit threshold, the weight inspection method comprising the steps of:

setting a second lower-limit threshold which is yet smaller than the first lower-limit threshold; and determining whether or not the total weight of the resin products is less than the second lower-limit threshold after a determination is made that the total weight of the resin products is less than the first lower-limit threshold.

(11) A weight inspection method in which there are provided an injection molding machine including a mold for molding resin products, conveying means for receiving and conveying the resin products which are dropped from the injection molding machine, and a weight inspecting apparatus for inspecting the weight of the resin products which have been conveyed by the conveying means, and inspection is performed as to whether or not the resin products are nondefective on the basis of whether or not the total weight of the plurality of resin products placed on the receiving member at a measuring position is between a first upper-limit threshold and a first lower-limit threshold, the weight inspection method comprising the steps of: setting a second upper-limit threshold which is yet greater than the first upper-limit threshold and a second lower-limit threshold which is yet less than the first lower-limit threshold; and determining whether or not the total weight of the resin products is greater than the second upper-limit threshold after a determination is made that the total weight of the resin products is greater than the first upper-limit threshold, and determining whether or not the total weight of the resin products is less than the second lower-limit threshold after a determination is made that the total weight of the resin products is less than the first lower-limit threshold.

(12) A weight inspecting apparatus in which a receiving member for placing thereon a plurality of resin products molded by injection molding is provided, the receiving member is movable between a receiving position for receiving the resin products at a position spaced apart from a weight measuring instrument and a measuring position for measuring the weight of the resin products on the weight measuring instrument, and inspection is performed as to whether or not the plurality of resin products placed on the receiving member at the measuring position are nondefective, the weight inspecting apparatus comprising:

storage means for storing in a multiplicity of stages an upper-limit threshold or a lower-limit threshold by using the total weight of the resin products as a reference; and determining means for determining whether or not the total weight of the resin products is greater than the threshold.

[Effects of the Invention]

As described above, in accordance with the invention, it is possible to improve the inspection accuracy of resin products.

What is claimed is:

1. A weight inspecting apparatus in which a receiving member for placing thereon a plurality of resin products molded by injection molding is provided, said receiving member is movable between a receiving position for receiving the resin products at a position spaced apart from a weight measuring instrument and a measuring position for measuring the weight of the resin products on said weight measuring instrument, and inspection is performed as to whether or not the resin products are nondefective on the basis of whether or not the total weight of the plurality of resin products placed on said receiving member at the measuring position is greater than a first upper-limit threshold, said weight inspecting apparatus comprising:

storage means for storing a second upper-limit threshold which is yet greater than the first upper-limit threshold;

determining means for determining whether or not the total weight of the resin products is greater than the second upper-limit threshold when the total weight of the resin products is greater than the first upper-limit threshold; and signaling means for signaling a result of the determining means.

2. A weight inspecting apparatus in which a receiving member for placing thereon a plurality of resin products molded by injection molding is provided, said receiving member is movable between a receiving position for receiving the resin products at a position spaced apart from a weight measuring instrument and a measuring position for measuring the weight of the resin products on said weight measuring instrument, and inspection is performed as to whether or not the resin products are nondefective on the basis of whether or not the total weight of the plurality of resin products placed on said receiving member at the measuring position is less than a first lower-limit threshold, said weight inspecting apparatus comprising;

storage means for storing a second lower-limit threshold which is yet smaller than the first lower-limit threshold;

determining means for determining whether or not the total weight of the resin products is less than the second lower-limit threshold when the total weight of the resin products is less than the first lower-limit threshold; and signaling means for signaling a result of the determining means.

3. A weight inspecting apparatus in which a receiving member for placing thereon a plurality of resin products molded by injection molding is provided, said receiving member is movable between a receiving position for receiving the resin products at a position spaced apart from a weight measuring instrument and a measuring position for measuring the weight of the resin products on said weight measuring instrument, and inspection is performed as to whether or not the resin products are nondefective on the basis of whether or not the total weight of the plurality of resin products placed on said receiving member at the measuring position is between a first upper-limit threshold and a first lower-limit threshold, said weight inspecting apparatus comprising:

storage means for storing a second upper-limit threshold which is yet greater than the first upper-limit threshold and a second lower-limit threshold which is yet less than the first lower-limit threshold;

determining means for determining whether or not the total weight of the resin products is greater than the second upper-limit threshold when the total weight of the resin products is greater than the first upper-limit threshold, and determining whether or not the total weight of the resin products is less than the second lower-limit threshold when the total weight of the resin products is less than the first lower-limit threshold; and signaling means for signaling a result of the determining means.

\* \* \* \* \*